United States Patent
Seitz et al.

(10) Patent No.: US 6,494,645 B1
(45) Date of Patent: Dec. 17, 2002

(54) METHOD AND DEVICE FOR DETERMINING A POWDER QUANTITY OR CHANGE IN POWDER QUANTITY IN A CONTAINER

(75) Inventors: Kurt Seitz, Widnau (CH); Horst Adams, Altstätten (CH)

(73) Assignee: Wagner International AG, Altstatten (CH)

( * ) Notice: Subject to any disclaimer, the term of this patent is extended or adjusted under 35 U.S.C. 154(b) by 108 days.

(21) Appl. No.: 09/678,497

(22) Filed: Oct. 2, 2000

(30) Foreign Application Priority Data

Oct. 14, 1999 (DE) .......................................... 199 49 659

(51) Int. Cl.[7] .............................................. B65G 53/66
(52) U.S. Cl. ........................... 406/24; 406/197; 406/14; 406/138
(58) Field of Search ........................... 406/14, 24, 138, 406/197, 15

(56) References Cited

U.S. PATENT DOCUMENTS

| 4,480,947 A | * | 11/1984 | Nagasaka | 406/14 |
| 4,743,143 A | * | 5/1988 | Nagasaka | 406/14 |
| 4,941,778 A | | 7/1990 | Lehmann | |
| 5,487,624 A | * | 1/1996 | Toyota et al. | 406/14 |
| 5,864,239 A | | 1/1999 | Adams et al. | |

FOREIGN PATENT DOCUMENTS

| DE | 30 39 210 C3 | 5/1982 |
| DE | 43 44 701 A1 | 9/1995 |

* cited by examiner

Primary Examiner—Christopher P. Ellis
Assistant Examiner—Joe Dillon, Jr.
(74) Attorney, Agent, or Firm—Fenwick & West LLP

(57) ABSTRACT

The method according to the invention is suitable for determining a powder quantity in a container and for determining a change in powder quantity, i.e. the powder quantity that is supplied from the container(s). The powder is fluidized in the container, the pressure of the fluidized powder in the container is measured to determine the pressure of the fluidized powder or the change of the pressure between two measurements, wherein the powder quantity in the container, or which was supplied from the container between two measurements is calculated from the pressure or the change in pressure. By the method according to the invention it is possible by a simple pressure measurement to determine the powder quantity which is supplied per time unit from the container and which is sprayed by the coating apparatus, and therefore to determine the supplied powder mass flow.

17 Claims, 2 Drawing Sheets

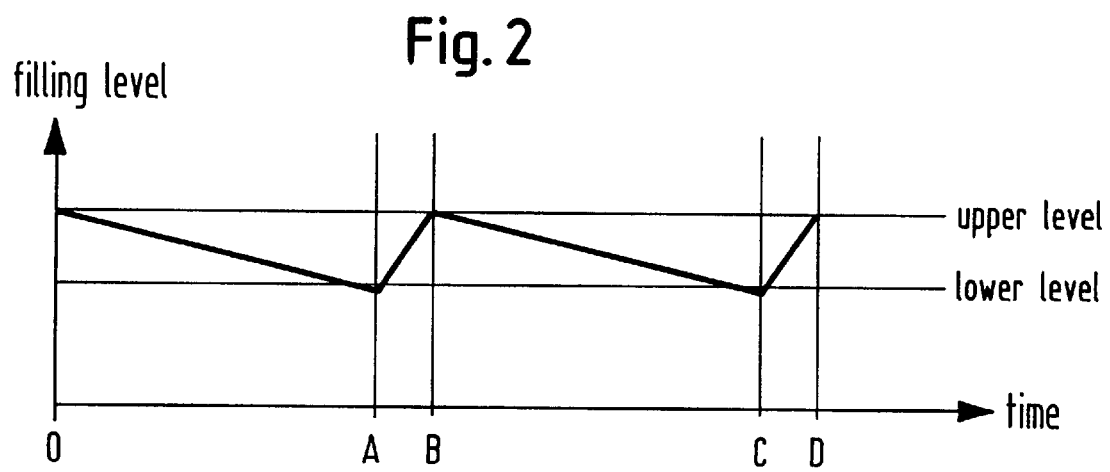
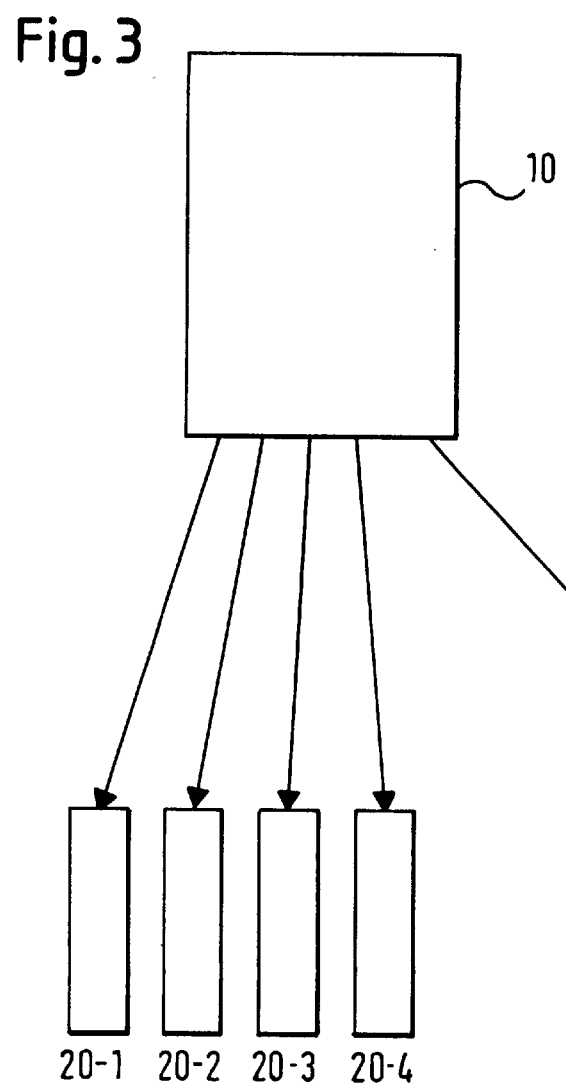

METHOD AND DEVICE FOR DETERMINING A POWDER QUANTITY OR CHANGE IN POWDER QUANTITY IN A CONTAINER

The present invention refers to a method and a device for determining a powder quantity or change in powder quantity in a container. The invention can in particular be applied to the field of powder coating to determine and control a powder mass flow which is supplied to a coating device and which is sprayed by same.

To supply powder coating devices, e.g. in electrostatic coating apparatus, with coating powder, the powder is fluidized, i.e. the powder is interspersed with a gas, preferably air, to form a powder-air mixture, and this powder-air mixture is supplied to the coating apparatus via supply lines. It may become necessary to determine the actually transported and supplied powder quantity per time unit, i.e. to determine the powder-mass flow (in g/min), during the operation of the coating apparatus, for instance to adjust the powder mass flow to a desired value or to maintain an adjusted value by means of a control.

Means for measuring a powder mass flow are known from the prior art which serve for determining the powder quantity discharged by a coating apparatus. U.S. Pat. No. 4,941,778 describes a method and a means for measuring and controlling the powder quantity which is supplied per time unit to a spray coating means in a powder coating apparatus. In the method described, the density (c) of the powder is measured in the powder-gas flow by a beam measuring means, the gas quantity per time unit (b) in the powder-gas flow is determined and the powder quantity per time unit (c) is determined by the equation $c = b \cdot a$.

A further example for the measurement of a powder mass flow that is supplied to a coating apparatus is described in U.S. Pat. No. 5,864,739. The device described in this specification measures two parameters, namely the speed V of the powder-air mixture in the supply line in m/sec and the powder mass per volume unit Mv in the supply line in $g/cm^3$. The powder mass flow and therefore the powder quantity which is supplied to the coating apparatus and which is sprayed by same can be calculated from the product of powder density and speed of the powder-air flow. The measurement of the speed is made by means of measuring electrodes that are spaced from each other and detect charge fluctuations at the supply line generated by the supplied powder-gas mixture. The measurement of the powder mass per volume unit is made by means of a resonator, which determines a change of the dielectricity constant and/or of the absorption in a resonance volume of the supply line as a shift of the resonance frequency.

A different type of measurement of the sprayed powder quantity is based on the determination of the change in weight of a powder reservoir. The weight of the powder reservoir is determined by means of scales, and while the powder is supplied from the powder reservoir to the coating apparatus and is sprayed by same, the weight of the powder container is continuously measured to determine the powder quantity over time. Such a measurement of the powder ejection at powder spray apparatus is known from DE 43 44 701 A1.

The known measuring methods require measuring means, such as scales or a resonator and measuring electrodes, which are relatively expensive.

DE 30 39 210 C3 describes a device for the indication of a bulk density and filling level of grained catalysts in a fluidized bed reactor, wherein a plurality of measuring tubes of pressure difference measuring devices are arranged at the reactor. By means of a first pressure differential measuring device the bulk density is calculated and indicated and by means of a second pressure differential measuring device and the previously detected bulk density the filling level is calculated and indicated.

Thus, it is the object of the invention to provide a device and a method of measuring a powder quantity which provide reliable results at the smallest possible expenditure.

The method according to the invention is suitable for determining a powder quantity in a container and for determining a change in powder quantity, i.e. the powder quantity that is supplied from or to the container. The powder is fluidized in the container, the pressure of the fluidized powder in the container is measured to determine the pressure of the fluidized powder or the change of the pressure between two measurements, wherein the powder quantity is calculated from the pressure or the change in pressure which is located in the container, or which was supplied from the container between two measurements.

The method according to the invention enables by a simple pressure measurement to determine the powder quantity which is supplied per time unit from a container and which is sprayed by a coating apparatus to thereby determine the supplied powder mass flow. Scales or other expensive measuring means are not necessary for this purpose.

The invention utilizes the fact that a so-called fluidization pressure builds up in the container above the fluidization means due to the fluidized powder. Since fluidized powder basically has the characteristics of a liquid, the physical properties of liquids also partially apply. As in a liquid, a certain pressure prevails in the fluidized powder which is proportional to the depth; this fluidization pressure only depends on the type of powder and the powder quantity provided in the container. If the powder quantity or the depth of the fluidized powder rises or falls, the pressure in the container also rises or falls proportionally thereto. This effect can be utilized for determining the filling quantity or for determining the change of filling quantity in a powder container.

Thus, the powder quantity in a powder reservoir container can be calculated by the method according to the invention in absolute figures or the change of the powder quantity in the powder container can be calculated on the basis of pressure conditions within the container. Furthermore, the method according to the invention when being used accordingly is also suitable for determining the height or change in height of the fluidized powder in the container.

The measurement of the powder quantity in the container on the basis of the fluidization pressure can be calibrated in a simple manner in that a known powder quantity is given into the container and the increase in pressure that results from the addition of the known powder quantity is measured. From the relation of known powder quantity and pressure increase at a subsequent measurement of the pressure, the powder quantity or powder quantity change in the container can be derived from the measured pressure.

The invention also provides a device for determining a powder quantity in a container, which comprises a fluidization means in the container, a supply means for supplying powder from the container, a pressure measuring means for measuring the pressure of the fluidized powder in the container and a calculation means for calculating a powder quantity in accordance with the pressure of the fluidized powder in the container. This device can be used for determining the powder quantity or the change of powder quantity in the container.

The invention will now be described in detail with reference to preferred embodiments in conjunction with the drawings.

FIG. 2 shows a time diagram of the change of the powder quantity in the container; and FIG. 3 shows a diagrammatical structure to explain the method according to the invention to supply a plurality of coating apparatus.

Figure 1:
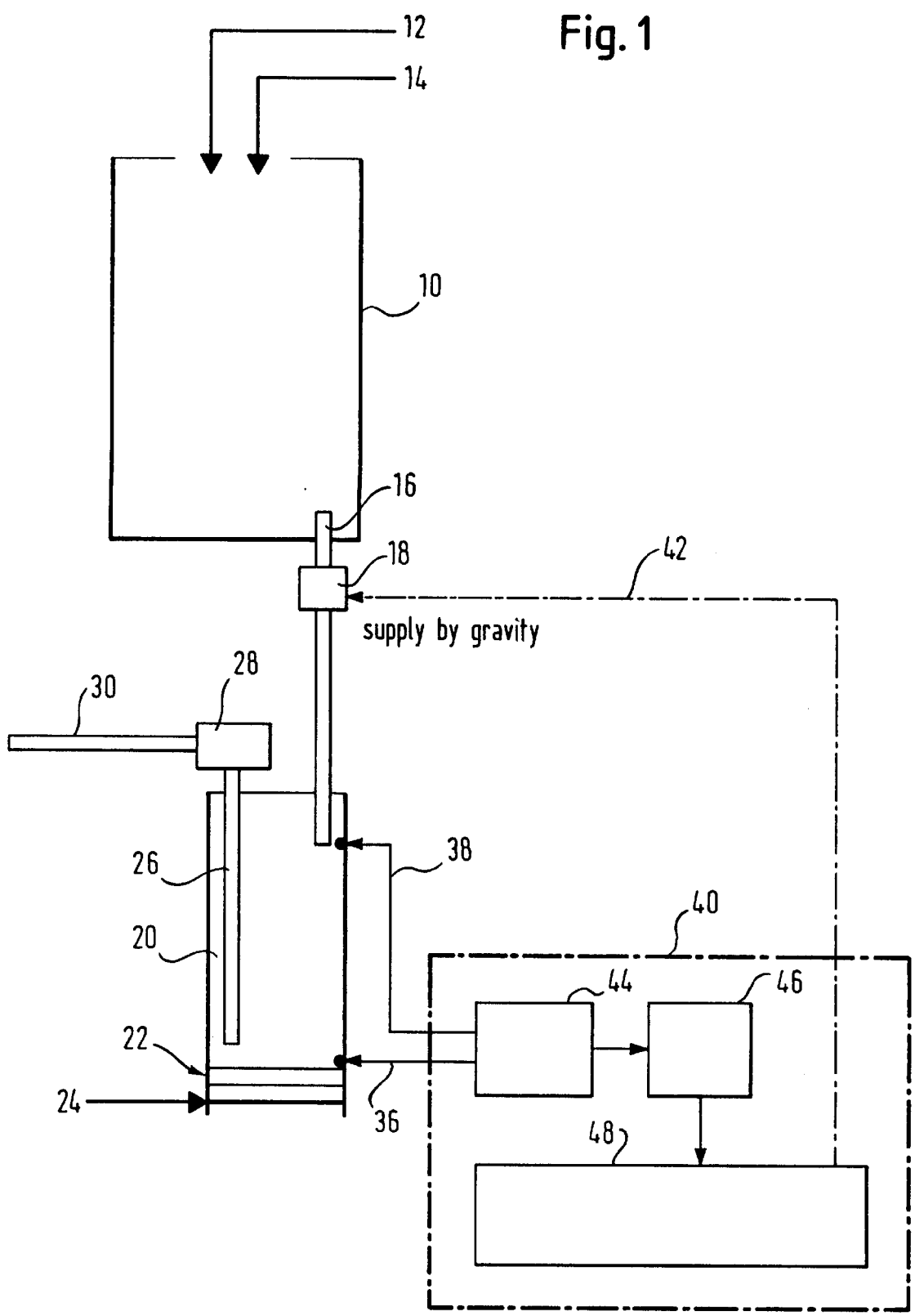
FIG. 1 shows the functional principle of the device according to the invention for determining a powder quantity in a container.

FIG. 1 diagrammatically shows a powder coating apparatus for explaining the functional principle of the method according to the invention for determining a powder quantity or change in powder quantity in a container.

A powder reservoir container 10 is shown in FIG. 1 to which fresh powder 12 and recovered recycling powder 14 can be supplied. The powder is fluidized in the powder reservoir container 10 (not shown) and is supplied via a supply line 16 and a valve 18, e.g. a squash valve, a further powder container, which serves as an intermediate or measuring container. The powder container 20 comprises a fluidization bottom 22 having a fluidization air inlet 24. A suction pipe 26 is inserted into the powder container 20, said suction pipe being connected via an injector 28 with a powder supply hose 30, which leads to a coating apparatus (not shown). A lower pressure measuring line 36 and an upper pressure measuring line 38 are attached at the powder container 290, said two lines leading to a differential pressure sensor 44 in a control and measuring electronics 40. Furthermore, a control line 42 leads from the control and measuring electronics 40 to the valve 18. The control and measuring electronics comprises besides the differential pressure sensor 44, a measuring amplifier 46 and an evaluation and control electronics 48. Preferably the evaluation and control electronics 48 also comprises a control unit for controlling the powder supply. The differential pressure sensor 44 generates an output signal which corresponds to the pressure difference in the powder container 20.

Instead of the differential pressure sensor 44 two pressure sensors (not shown) can also be provided in an alternative embodiment of the invention, wherein a lower and an upper pressure sensor measure the pressures in the lower and upper portion of the container 20, respectively. The output signals of these pressure sensors are supplied to an electric or electronic subtraction circuit (not shown), which determines the pressure difference between the sensors and thus in the container.

The invention will now be described in more detail with reference to an embodiment, in which a coating apparatus (not shown) is supplied from the powder container 20. The powder container 20 is supplied with powder from the powder reservoir container 10 via the supply line 16 and the valve 18, wherein the powder in the container 20 is fluidized above the fluidization bottom 22. It is ensured that the level of the fluidized powder does not exceed or fall below an upper and a lower limit value (not shown), as will be described further below. The injector 28 supplies via the suction tube 26 and the powder hose 30 the fluidized powder to the coating apparatus (not shown), wherein during the pressure measurement powder is not filled from the powder reservoir container 10 into the powder container 20, in order not to falsify the measuring result. The reduction of the powder quantity in the container 20 is accompanied by a corresponding drop of the fluidization pressure across the fluidization bottom 22. By determining the fluidization pressure in the container 20 by means of the differential pressure sensor 44 and the change of the fluidization pressure over the time, the powder quantity in the container 20 or a change thereof can be determined provided that the evaluation and control electronics 48 are calibrated correspondingly. The quantity of the powder supplied to the coating apparatus, e.g. in g/min, can directly be calculated therefrom.

FIG. 1 shows a lower pressure measuring line 36 and an upper pressure measuring line 38 which are connected to the differential pressure sensor 44 to derive a differential pressure between a position directly above the fluidization bottom 22, i.e. below the fluidized powder, and a position in the upper portion of the powder container 20. This differential pressure corresponds to the pressure generated by the fluidized powder in the powder container, and makes the measuring system insensitive against fluctuations of the ambient pressure. If the ambient pressure is known, the differential pressure sensor 44 can also be replaced by one single pressure sensor on the level of the fluidization bottom 22, and the pressure generated by the fluidized powder in the powder container 20 can be calculated by subtraction of the ambient pressure from the measuring value of the lower pressure sensor (not shown).

To calculate the quantity or change in quantity of the powder in the powder container 20 depending on the fluidization pressure, a simple calibration of the control and measuring electronics 40 is made. For this purpose the normal supply operation is interrupted, i.e. the injector 28 stops supplying powder from the powder container 20, and no more powder is supplied to the powder container 20 from the supply line 16. The fluidization pressure in the powder container 20 is measured and then an exactly weighted quantity of the powder used is filled into the powder container 200, e.g. 200 g of powder. The new fluidization pressure that builds up due to the changed powder quantity is measured again and the increase in pressure, which corresponds to the added powder quantity (200 g) is stored. Thereby the control and measuring electronics 40 "learns" the relation between powder quantity and fluidization pressure.

The measuring method described is suitable for the absolute quantity measurement in the powder container 20 and for the measurement of small and large supply quantities of the powder to the coating apparatus. For the precise measurement of small supply quantities, the bottom surface of the powder container 20 shall be comparatively small, so that a small change of the powder quantity in the powder container 20 leads to a sufficient change in height and therefore to a sufficient change in pressure in the container 20. In the case of large powder spray quantities, the powder container 29 can have a correspondingly greater bottom surface.

As explained above, a precondition for the precise measurement of the powder quantity that is supplied from the powder container 20 is that no powder is supplied to the container 20 during the measurement. The powder level in the container 20 therefore continuously falls, and when reaching a lower limit value of the powder level the measurement should be stopped and the supply from the powder reservoir container 10 should be turned on. During this supply, a measurement of the powder supplied via the injector 23 and the container 20 cannot be made. The measuring device according to the invention can be used during the filling of powder into the powder container 20 by simultaneous fluidization of the supplied powder in order to determine the powder level in the powder container 20 and to stop the further supply when a predetermined upper powder level is reached.

The dependency of the powder level on the fluidization pressure can be empirically determined in a similar manner as described above with respect to the powder quantity. If during the further supply a desired powder level is reached in the powder container 20, the valve 18 is closed and the measurement of the powder which is supplied from the powder container 20 via the injector 28 can be continued.

Although an uninterrupted determination of the powder quantity supplied from the powder container 20 is not achieved by the method according to the invention, a percentage proportion of the measuring time to the refill time of up to 90% can, however, be attained.

FIG. 2 shows a time lapse diagram of the filling level in the powder container 20, wherein alternately powder is supplied from the container 20 and is refilled into same. Between the instant 0 and the instant A the injector 28 continuously supplies powder from the powder container 20 so that up to the instant A the powder level or the powder quantity in the container 20 continuously reduces. Between the period of time 0 to A the powder quantity per time unit supplied from the powder container 28 is determined as mentioned above. At the time A a lower level in the powder container 20 is reached, the measurement of the powder quantity supplied from the container 20 is interrupted and the refill of fresh powder from the powder reservoir container 10 is started. As may be seen in FIG. 1, the valve 18, e.g. a squash valve, is opened for this purpose. During refilling powder into the powder container 20, the powder quantity or the powder level in the container must be monitored. This can be performed by means of the differential pressure sensor 44 as described above or in a different, conventional manner. The refilling period corresponds to the period of time between A and B, wherein the measuring device determines at the instant B that an upper powder level is reached in the powder container 20 and the valve 18 is closed. A further measuring period can now follow between the instants B and C during which the powder quantity is determined which is supplied from the powder container 20 via the injector 28. This process continuously repeats, wherein the powder quantity per time unit refilled from the reservoir container 10 shall be significantly larger than the powder quantity supplied from the powder container 20 via the injector to thereby keep the refill period as short as possible.

During the entire period, i.e. during the refilling process between the instants A and B, and C and D and during the powder supply from the powder container 20 between the instants 0 and A, and B and C the powder supply via the injector 28 can be operative, wherein a reliable measurement of the powder quantity discharged is only possible during intervals A to B and C to D.

The powder quantity in the powder container 20 and the powder quantity supplied may be indicated and/or may be supplied to a powder quantity controller (not shown) as an actual value. By means of the actual powder quantity in the powder container 20 the powder quantity controller may control the refill of the powder container 20 in accordance with the powder level in the container. A further powder quantity discharge controller (not shown) may control the injector 28 to supply a desired powder discharge quantity to the coating apparatus.

FIG. 3 diagrammatically shows an arrangement from a powder reservoir container 10 and a plurality of measuring containers 20-1 to 20-n to supply a plurality of coating apparatus (not shown). The method and the device according to the invention were explained above by means of a supply injector and a powder coating apparatus, which receives powder from the powder container 20. In a powder coating apparatus comprising a plurality of supply injectors and coating guns, each coating gun requires for implementing the method of the invention an independent measuring container 20-1 and 20-n and a separate supply, including a valve, for the refill from the reservoir container to the measuring containers 20-1 to 20-n. Since the powder quantity supplied from the powder container 20 to the coating gun is determined only on the basis of the reduction of the powder quantity in the powder container 20, a reliable measurement can only be performed under the condition that during the measurement of the powder mass flow supplied to the coating apparatus, powder is not at the same time taken from or supplied to the powder container 29 at another position.

To supply a plurality of coating guns, the invention therefore provides an independent measuring container 20-1 to 20-n for each coating gun. The refill of the powder for the measuring containers 20-1 to 20-n is carried out from a large reservoir container 10. The measuring containers 20-1 to 20-n comprise, as the powder containers 20 of FIG. 1, pressure sensors, a fluidization means and a suction means.

In order to structure the device according to the invention in a possibly simple manner, the reservoir container 10 can be arranged above the powder containers 20, 20-1 to 20-n so that the powder from the reservoir container to the measuring container may flow by the effect of gravity.

In a further embodiment of the invention that is not shown in the Figures, the measurement of the fluidization pressure in the powder container 20 may be performed by means of a rod-shaped immersion probe. The probe comprises two pressure sensors, one of which being attached at its lower end and the other one being attached at its upper end. By means of the probe the lower pressure sensor is immersed into the powder container 20 up to the container bottom just above the fluidization means 20, whereas the upper pressure sensor is lying shortly below the container cover (not shown) in the upper portion of the powder container 20. By means of this immersion probe the differential pressure in the powder container can be derived by means of a suitable evaluation electronics, said differential pressure corresponding to the fluidization pressure. The powder quantity or the powder level in the powder container 20 can in turn be derived in the above-mentioned manner from the fluidization pressure. Instead of the pressure sensors, pressure measuring lines can also be attached at the immersion probe, said pressure measuring lines leading to a differential pressure sensor.

The advantage of this embodiment of the invention is that the measuring device according to the invention can be used in combination with any existing powder container without changes having to be made at the container wall or in particular at the sensitive fluidization means.

The features disclosed in the above description, in the claims and in the drawings can be essential individually and in any combination thereof for the realization of the invention in its various embodiments.

What is claimed is:

1. A method of determining a powder quantity which is fluidically supplied from a powder container (20) during a powder coating process, wherein the powder is fluidized in the container (20), the powder is supplied from the container (20) to a powder coating apparatus, the pressure of the fluidized powder is measured in the container (20) in time intervals, the change of the pressure during each measuring interval is determined and from the change in pressure the powder quantity is calculated which was supplied during the measuring interval from the container (20).

2. Method according to claim 1, characterized in that a change in height of the fluidized powder in the container (20) is also derived from the change in pressure.

3. Method according to claim 1, characterized in that the container (20) comprises a fluidization bottom (22) and the pressure is measured in the container (20) directly above the fluidization bottom (22).

4. Method according to claim 1, characterized in that no powder is supplied to the container (20) during the supply of powder from the container (20) and the measurement of the pressure.

5. Method according to claim 1, characterized in that the powder quantity is calculated in accordance with the composition of the powder.

6. Method according to claim 1 for operation with two pressure sensors and a calculation means for determining a powder quantity in a supply container used in a coating apparatus, wherein the two pressure sensors are arranged in the container to measure a pressure of the fluidized powder, and the calculation means responds to the two pressure sensors for calculating the change of powder quantity.

7. Method according to claim 1, characterized in that a known powder quantity is filled into the container (20) and the increase in pressure, which results from the addition of the known powder quantity, is measured, the resulting ratio from the known powder quantity and pressure increase is stored and the calculation of the powder quantity is subsequently performed by means of the ratio of the known powder quantity and the pressure increase.

8. Method according to claim 1, characterized in that the powder is supplied from the container (20) until the powder level in the container reaches a lower threshold value, the measurement is then interrupted and powder is refilled into the container (20) until the powder level has reached an upper threshold value.

9. Method according to claim 1, characterized in that the powder is supplied to one or to a plurality of coating apparatus.

10. Method as claimed in claim 9, characterized in that one measuring container (20-1 to 20-n) is assigned to each coating apparatus, the powder being fluidized and the pressure of the fluidized powder being measured in said measuring container.

11. Method according to claim 1 performed with two pressure sensors, characterized in that the two pressure sensors are arranged in the container to measure a pressure of the fluidized power from which the change of powder quantity is calculated.

12. The method of claim 11, wherein the pressure sensors are arranged in the container near the bottom of the container and in an upper portion of the container.

13. Method according to claim 11, characterized in that the two pressure sensors sense a lower chamber pressure and upper chamber pressure to provide an indication of a differential pressure therebetween.

14. Method according to claim 1, characterized in that the pressure of the fluidized powder is determined in a lower portion of the container (20) and a reference pressure is determined in an upper portion of the container (20), and a differential pressure is calculated from the two pressures, and the quantity of the fluidized powder in the container (20) is calculated from the differential pressure.

15. Method as claimed in claim 14, characterized in that the height of the powder fluidized in the container (20) is calculated from the differential pressure.

16. Method as claimed in claim 14, characterized in that a container cover is arranged opposite to the container, and the reference pressure is measured closely below the container cover.

17. Method of controlling a powder spray quantity, that is fluidically supplied by a powder coating apparatus, wherein the powder is fluidized in the container (20), the powder is supplied from the container (20) to a powder coating apparatus, the pressure of the fluidized powder is measured in the container (20) in time intervals, the change of the pressure during each measuring interval is determined and from the change in pressure the powder quantity is calculated which was supplied during the measuring interval from the container (20) and the supply of the powder is controlled depending on the calculated powder quantity and a powder spray target value.

* * * * *